United States Patent [19]

Mori et al.

[11] Patent Number: 4,608,525
[45] Date of Patent: Aug. 26, 1986

[54] CELLULAR TYPE ROBOT APPARATUS

[75] Inventors: Kinji Mori, Yokohama; Shoji Miyamoto, Kawasaki; Hirokazu Ihara, Machida, all of Japan

[73] Assignee: Hitachi, Ltd., Tokyo, Japan

[21] Appl. No.: 623,087

[22] Filed: Jun. 21, 1984

[30] Foreign Application Priority Data

Jun. 22, 1983 [JP] Japan ............................... 58-110925

[51] Int. Cl.[4] ............................................ G05B 19/42
[52] U.S. Cl. ..................................... 318/568; 364/513; 901/6
[58] Field of Search ..................... 318/568, 625; 901/6, 901/7, 8; 364/513

[56] References Cited

U.S. PATENT DOCUMENTS

| | | | |
|---|---|---|---|
| 3,937,057 | 2/1976 | Trolle | 901/6 X |
| 4,084,083 | 4/1978 | McNalley et al. | 318/625 X |
| 4,348,623 | 9/1982 | Kobayashi et al. | 901/6 X |
| 4,422,027 | 12/1983 | Mohlere | 318/625 |
| 4,442,387 | 4/1984 | Lindbom | 318/568 |
| 4,503,507 | 3/1985 | Takeda et al. | 318/568 |

Primary Examiner—B. Dobeck
Attorney, Agent, or Firm—Antonelli, Terry & Wands

[57] ABSTRACT

This invention relates to a cellular type robot apparatus consisting of a plurality of robot cells each having intelligence, wherein each robot cell controls its own operation on the basis of information exchange with adjacent robot cells. The operations of the robot cells are as a whole coordinated, and each robot cells can be controlled without the necessity of change of hard- and soft-wares even when one or more of the robot cells are out of order or when the robot needs to be expanded. Each robot cell can be provided so that the robot can be increased or decreased in a building block arrangement. More definitely, each robot cell has arms corresponding to hands and feet, and is able to control its own operation. As the robot cells are connected and combined through transmission routes so as to be able to exchange information, they can operate cooperatively as a group to perform a manpulative action. The operation of the group of robot cells is designed also to constitute the shape of a predetermined pattern besides the operations of entwining an object, and gripping and moving the object.

16 Claims, 13 Drawing Figures

CELLULAR TYPE ROBOT APPARATUS

BACKGROUND OF THE INVENTION

1. Field of the Invention

This invention relates to a method of constituting a robot consisting of a plurality of robot cells that can operate independently, are connected to one another and move coordinately due to information exchange between them to perform a manipulative action. The present invention relates also to an apparatus for realizing such a robot.

2. Description of the Prior Art

In a conventional robot, the function of the robot is distributed to each portion of the robot, the data from each distributed portion is gathered by a central processing unit, and the central processing unit in turn operates each distributed portion by giving an instruction thereto.

Therefore, it has been necessary to produce a specific apparatus for each distributed portion, and when the central unit is out of order or operates abnormally, it is likely that the robot as a whole undergoes a breakdown or operates dangerously. Moreover, the robot must be changed in accordance with the size of an object which is to be dealt with by the robot. The freedom of operation of the robot, which is determined by the number of a joints of arm, is low, so that the robot can not operate flexibly and continuously, and its response is low.

SUMMARY OF THE INVENTION

The present invention is directed to provision of a robot apparatus which can be assembled by merely combining in various ways a plurality of autonomous robots cells, that can operate independently with one another, so as to eliminate the necessity of a central unit, but has the advantage that it does not undergo system breakdown when one or more of the robot cells is or are out of order, and has a high response because the individual robot cells react simultaneously, can perform flexible operations, and because they exchange information between them and coordinate with one another to control their operations by themselves.

Each robot cells includes first means for detecting its own operating condition, second means for detecting the operation of the other robot cells, means for setting the object of its own operation on the basis of the conditions detected by the first and second means, and means for controlling its own operation in accordance with the object of the overall operation.

The cellular type robot apparatus of the invention consists of at least one group of robot cells of the type described above that are connected with one another, and may include third means for setting the object of the overall operation of the group of robot cells.

DESCRIPTION OF THE PREFERRED EMBODIMENTS

Figure 1:
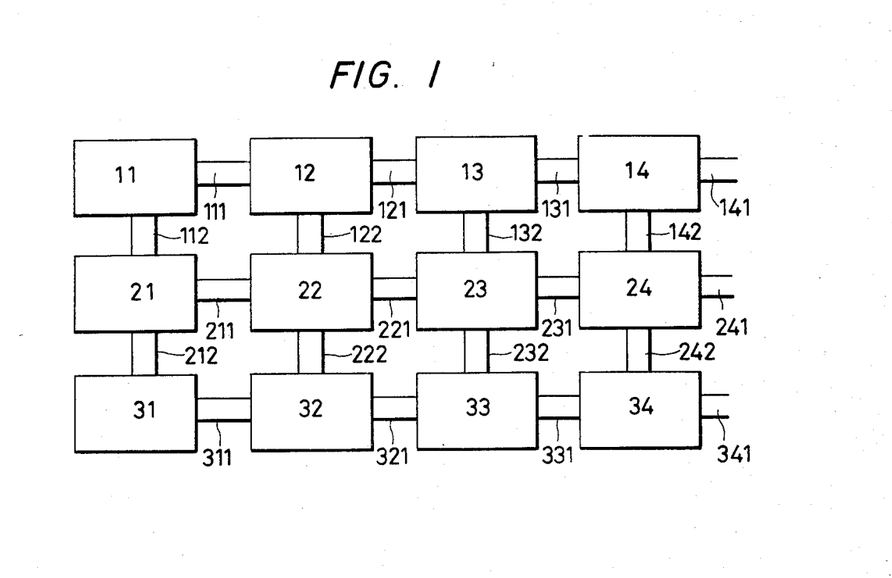
FIGS. 1 and 2 show the overall construction of the system of the present invention.

FIG. 1 shows the overall construction of the system. The robot is constructed as a whole by a plurality of robot cells 11, 12, ..., and these cells are connected to adjacent robot cells by arms 111, 121, ... 112, 212, ..., .. In FIG. 1, the robot cells are shown disposed on a two-dimensional plane, and each cells 11, 12, ... is connected to the adjacent robot cells on the lateral and longitudinal axes by the lateral arms 111, 121, ... and the longitudinal arms 112, 122, ..., respectively.

Figure 2:
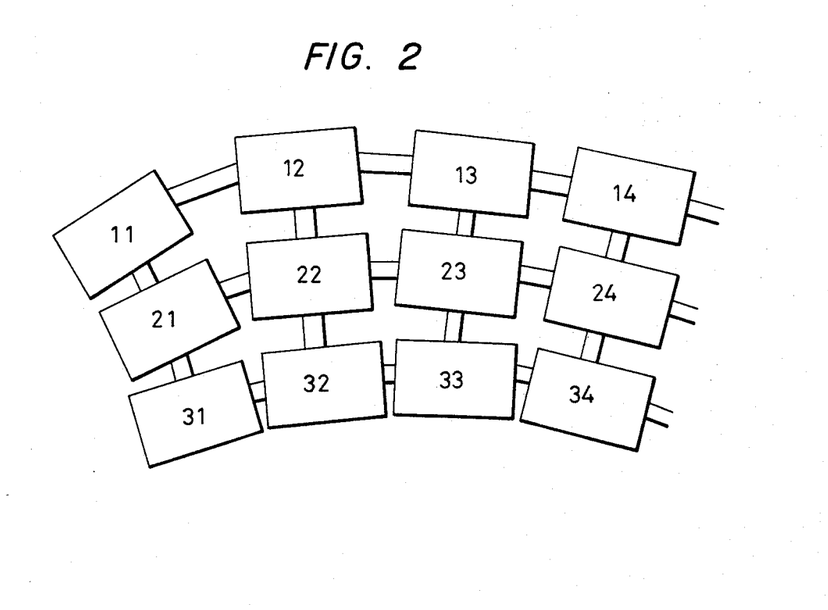
Figure 3:
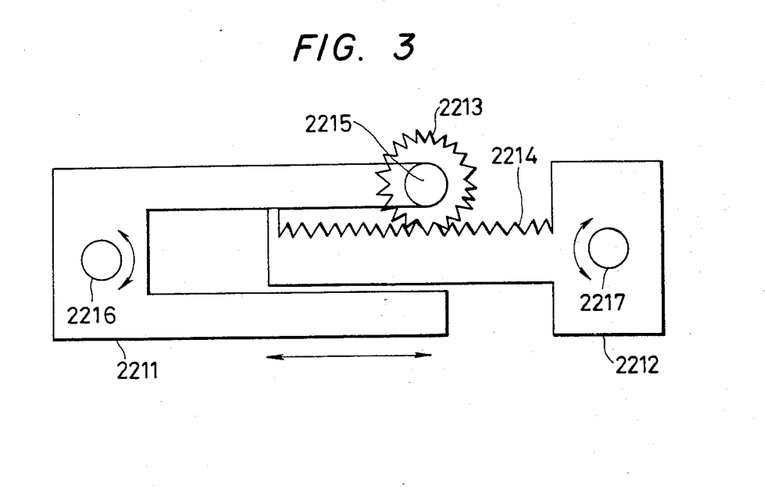
FIG. 3 shows an arm driving device of one embodiment of the present invention.
Figure 5:
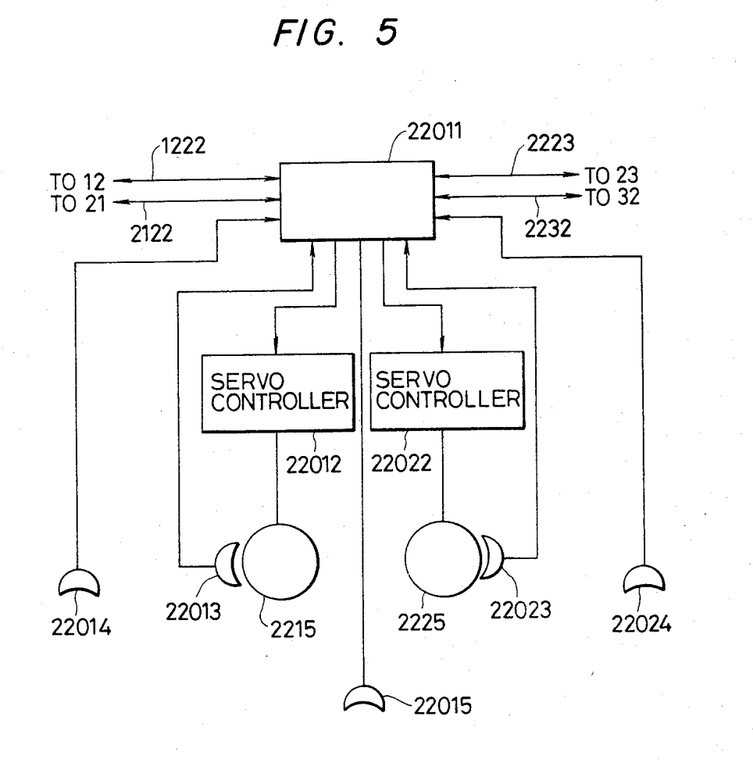
FIG. 5 shows one embodiment of a controller inside the cell of the present invention.

The structure of each robot is changed as depicted in FIG. 2 when the lengths of the respective lateral and longitudinal arms are adjusted. An arm driver such as shown in FIG. 3 and a controller for driving the arm such as shown in FIG. 5 are incorporated in each robot cell. Each controller is connected to the controllers of the adjacent robots by a transmission medium so as to exchange information. Since the information is exchanged between the adjacent robot cells, each cell operates cooperatively.

FIG. 3 shows the arm driver of each robot cell. One of the arms is an active arm 2211 equipped with a servo motor 2215 and a gear 2213, while the other is a negative arm 2212 equipped with a guide 2214 for the gear 2213. These active and negative arms 2211 and 2212 are connected to the robot cell main body by shafts 2216 and 2217, respectively. Unless these shafts are locked, the arms can freely change their directions. The arm length can also be adjusted freely by rotating the gear 2213 using the servo motor 2215.

Figure 4:
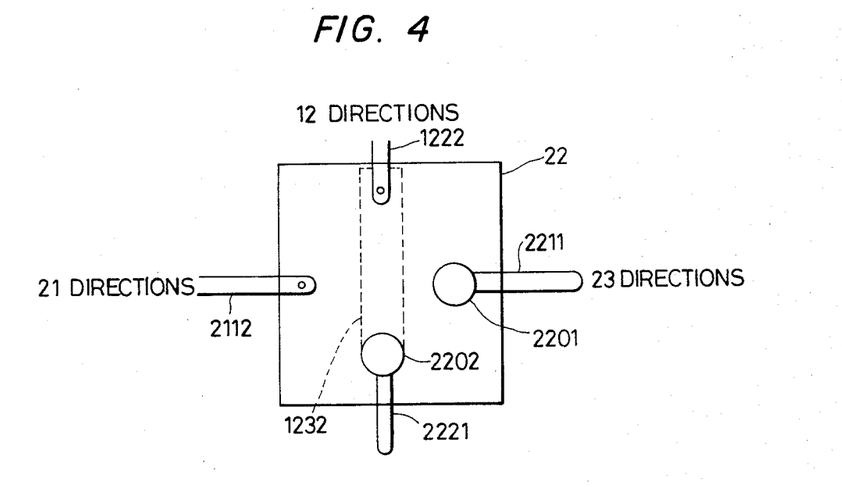
FIG. 4 shows a first embodiment of the cell of the present invention.

As shown in FIG. 4, the active arms 2211, 2221 and the negative arms 1222 and 2112 are disposed inside the robot cell in the lateral and transverse directions, respectively, and are connected to the four robot cells adjacent thereto. The robot cell can move freely in the lateral and longitudinal directions by the active arms 2211 and 2221. In the active arms, too, the gear can be freely rotated (or be brought into the free state) by cutting off the power of the servo motor 2215. The arm length can be fixed (or locked) by fixing the gear 2213. A longitudinal arm fixing connector 1232 is disposed so as to integrally connect the active/negative arms 1222, 2221 of the longitudinal axis and to prevent them from rotating independently.

The internal construction of the robot cell is such as shown in FIG. 5. The controller 22011 calculates the moving quantity of the arm on the basis of information applied thereto from sensors 22014, 22024 for recognizing an object existing in the longitudinal and lateral directions, for example, from an angle sensor for measuring the angle between the negative longitudinal and lateral arms, and from the adjacent robot cells through the transmission routes 1222, 2122, 2223, 2232, and generates an instruction to servo controllers 22012, 22022 so as to actuate the servo motors 2215, 2225 on the active arms in both lateral and longitudinal directions. The servo motors 2215, 2225 rotate on the basis of this instruction and turn the gear 2213. The angle of rotation of the servo motors 2215, 2225 are sensed by the sensors 22013, 22023, and are fed back to the controller 22011. If the instructed angle of rotation is different from the actual angle of rotation of the servo motor, the controller applies a correcting angle of rotation to the servo controller.

The controller also gives the instruction as to whether the gear should be kept under the free or locked state.

Figure 9:
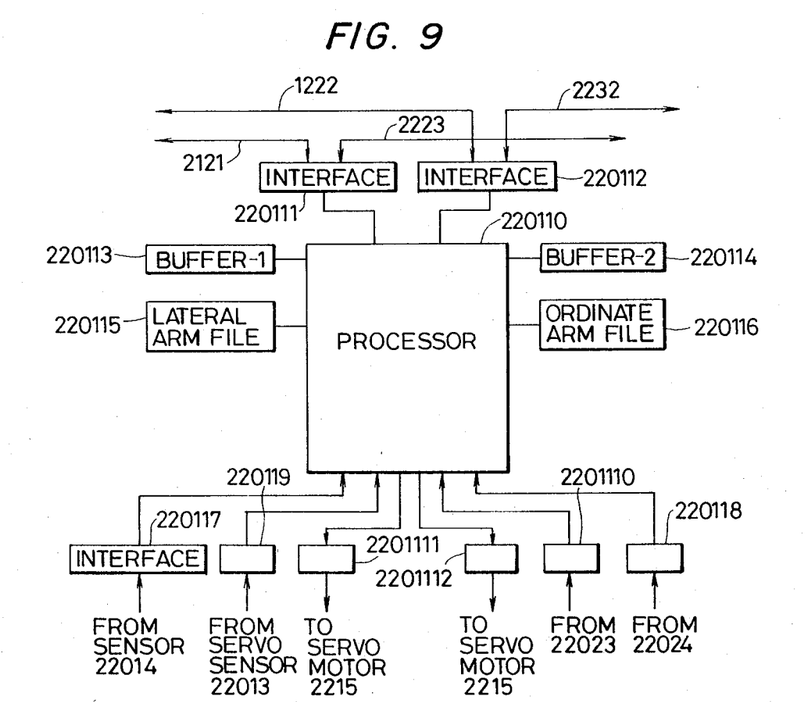
FIG. 9 shows the construction of controller inside the cell of the present invention.

FIG. 9 shows the internal construction of the controller. The processor 22010 of the controller exchanges the data with the adjacent robot cells through the transmission routes 1222, 2122, 2232, 2223 and interfaces 220111, 220112. It also gives and receives signal data with the sensor, the servo sensor and the servo motor through the interfaces 220117-2201111. The data received from, or to be delivered to, the interfaces 220111, 220113, 220115, 220117, 220119, 2201111 are stored in buffers 1, 220113. On the other hand, the data to be received from and delivered to, through the interfaces 220114, 220116, 220118, 2201110, 2201112 are stored in buffers 2, 220114. The buffer 1 stores the data relating to the lateral direction, and the buffer 2 does the data on the longitudinal direction. On the basis of the data inside these buffers, the processor 220110 calculates the adjusting quantities of the lateral and longitudinal active arms, and the result of calculation is stored in each arm file 220115, 220116. The processor 220110 controls the servo motors 2215, 2225 on the basis of the data inside these files 220115, 220116.

Figure 8:
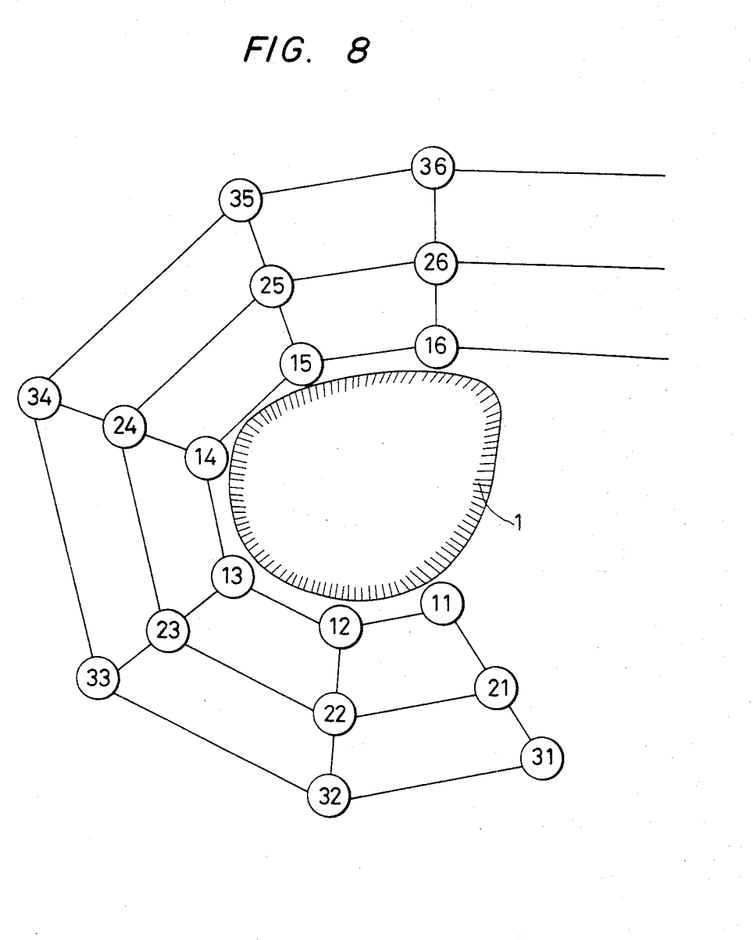

The operation of each robot cell and the operation of robot part formed of a group of robot cells will now be described with reference to FIGS. 6 through 8.

It will be assumed that the robot cells 11 through 37 are arranged in three columns and seven rows and 17, 27 and 37 are fixed to support poles. These robot cells are directed (1) to encompass an object 1, (2) to grip the object 1 with a predetermined force, and (3) to move the object 1, and the cell operate in the three steps in accordance with the stated objective of moving object. First of all, the first step will be described. Assuming now that the object 1 and the robot part formed of the group of robot cells are spaced apart from each other as shown in FIG. 6, then each robot cell extends the lateral arm if the robot cell is out of contact the object 1. In this case, the longitudinal arm is locked and the lateral arms of the cells 21-27, 31-37 are kept free so that the cells of each row move in parallel with one another. When the lateral arms of the robot cells 11-17 are gradually extended, the sensor 22024 of the cell 11 first senses the object 1. Then, the free state of the lateral arm of each robot cell 11, 21, 31 is released. As the arms of the robot cells 11-17 are extended further, robot cell 11 moves towards the object 1, so that the arm between the robot cells 11 and 12 keeps an angle $\theta$ relative to the longitudinal arms between the robot cells 32, 22 and 12. The robot cells 11, 21, 31 control the active arms so that the lateral arms of the adjacent robot cell pairs (11, 12), (21, 22), (31, 32) of each row are parallel to one another. Therefore, the robot cell 12 which detects the change of the longitudinal/lateral negative arm angle $\theta$ by its arm angle sensor 22015 informs those robot cells 11, 22 which have the active arms and are adjacent thereto in the lateral and longitudinal directions, of the angle $\theta$ at that time.

Figure 10:
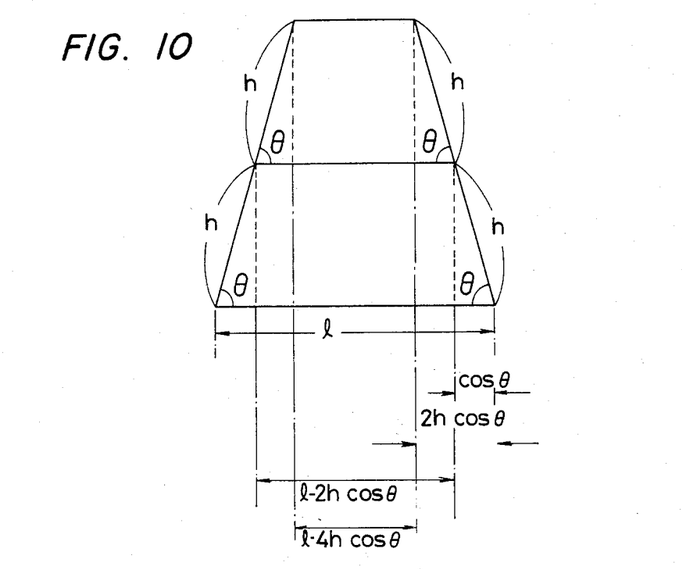
FIG. 10 shows the concept of the motion of the arm of the cellular robot of one embodiment of the present invention.

Upon receiving this data $\theta$, the robot cell 22 likewise transmits the data to the adjacent cells 21 and 32, at a scheduled time and the robot cell 32 transmits it to the cell 31 upon receiving the data $\theta$. In this manner, the angle $\theta$ is detected at a scheduled time and is transmitted to the adjacent robots. The robot cell 11 informs the robot cells 21 and 31 of the arm length between the cells 11 and 12. The robot cells 21, 31 having the active arms calculate the lateral arm lengths in accordance with the algorithm shown in FIG. 10. As the arm length h between the robot cells 11 and 21 is known in advance, the robot cell 21, for example, calculates the lateral arm length l (21, 22) in accordance with the following equation on the basis of the lateral arm length h and the angle $\phi$ informed from the robot cells 12 and 11:

$$l(21, 22) = l - 2h \cos \theta \qquad (1)$$

Likewise, the robot cell 31 calculates l (31, 32) in accordance with the following equation:

$$l(31, 32) = l - 4h \cos \theta \qquad (2)$$

The robot cells 21 and 31 move the servos of the lateral active arms in accordance with this value, thereby adjusting the arm lengths. When the cells 21 and 31 adjust the arm lengths, the cell 11 does not change the arm length, while the cell 12 fixes the shaft 2216 of the arm between it and the cell 11 to prevent its rotation.

In this manner, the robot cell 11 changes the arm angle on the basis of the operations of the object sensors 22014, 22024 while extending the lateral arm but not separating away from the object. If the arm angle between the robot cells 11 and 12 changes, each robot cell 21-27, 31-37 adjusts the arm in accordance with the algorithm described above.

In order to let the robot cells 12-17 smoothly entwine the object 1, the cells 12, 22, 32 on each row periodically send information on the arm angle and length relative to the robot cell 11, 21, 31 to the subsequent robot cell 13, 23, 33 on the rear row. Similarly, the cells 13, 23, 33 inform the subsequent cells 14, 24, 34 of the arm angle and length at that time. In this manner, the robot cells on the front row send information on the existing arm angle and length to the subsequent cells on the rear row. As each robot cell advances and reaches the position where the subsequent cell has been occupied, it adjusts the arm angle and length on the basis of the data that has already given thereto.

Incidentally, when the arm angle $\theta$ becomes small and the arm length between the adjacent robot cells 11-12 becomes small, the arm length l (31, 32) between the robot cells 31 and 32 is below the minimum arm length $l_{min}$, that is, $$l(31, 32) = l - 4h \cos\theta$$
$$< l_{min}$$

and the robot cell 31 can not achieve the arm angle $\theta$. In other words, since the robot 31 can not attain the arm angle $\theta$, it comes into contact with the robot cell 32. Since such occurrence is possible, each robot cell controls the servo so as to realize the minimum arm length $l_{min}$ if the calculated value of the lateral arm length is below the predetermined minimum arm length $l_{min}$.

Figure 11:
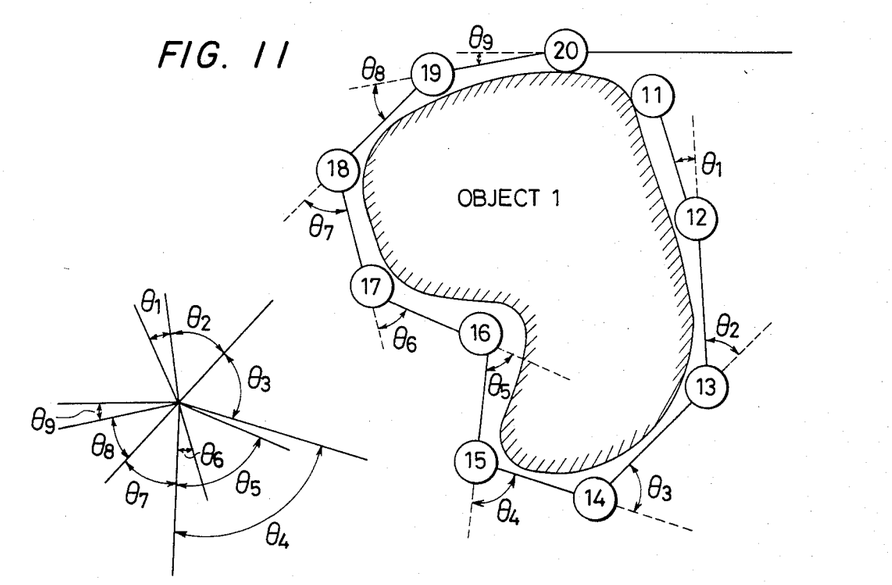
FIGS. 11 through 13 show the operation due to the relation between a group of cells of the present invention and an object.

Judgement whether or not the arms entwine the object is made in the following manner. If the arms are judged as entwining the object, the second step mentioned above is followed. FIG. 11 shows the state in which the arms encompass the object 1. The robot cells 12 through 19 between the robot cells 11 and 19 on both ends come into contact with the object 1, and the robot cell 20 calculates the angle of their lateral arms on the basis of the value of the arm angle sensor 22015. If the angle θ exists on the side opposite to the longitudinal arm, $\theta > 0$ and when the angle exists on the side of the longitudinal arm, $\theta < 0$.

In FIG. 11, therefore, $\theta_5 < 0$ for the robot cell 16, and $\theta_1, \theta_2, \theta_3, \theta_4, \theta_6, \theta_7, \theta_8, \theta_9 > 0$ for the robot cells other than the cell 16. Each robot cell exchanges this angle at a scheduled time, and calculates the sum $\theta$ of these angles:

$$\sum_{i=1}^{9} \theta_i = \bar{\theta}$$

When $\theta$ is greater than a certain predetermined angle $\hat{\theta}$, the arms are judged as entwining the object 1.

Figures 6, 7:
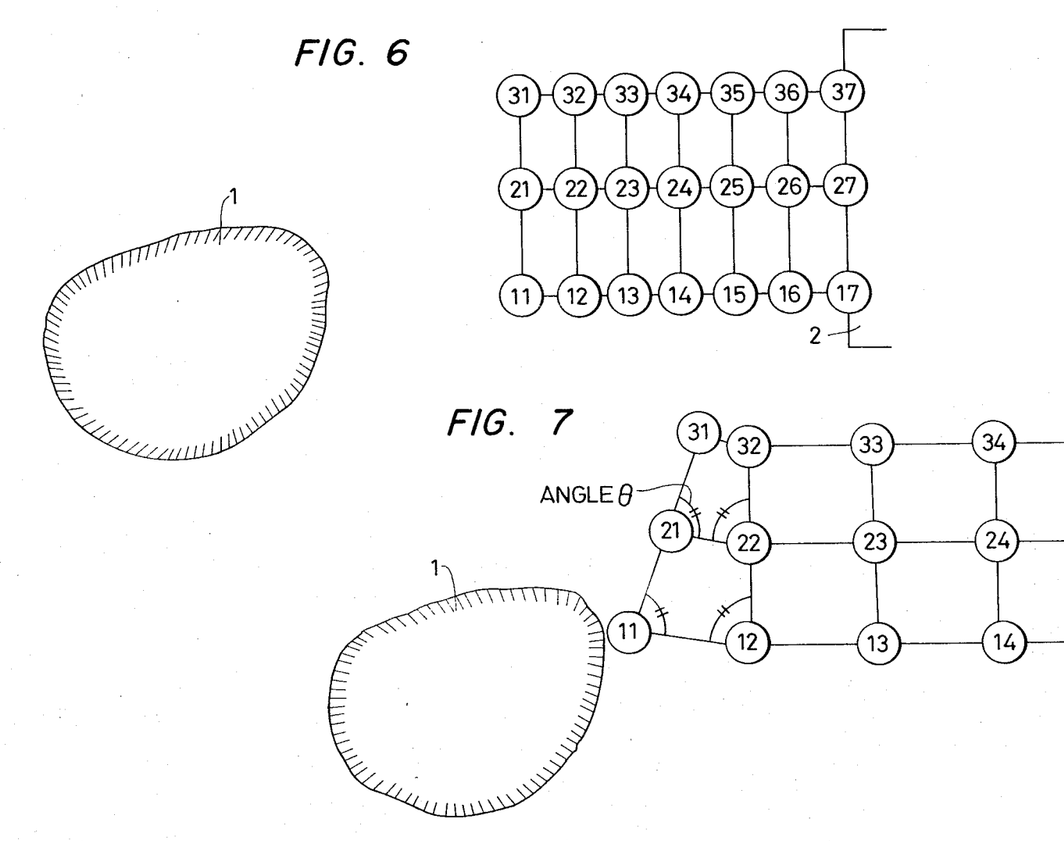
FIGS. 6 through 8 show the concepts of the operation of a group of robot cells of the present invention.
Figure 12:
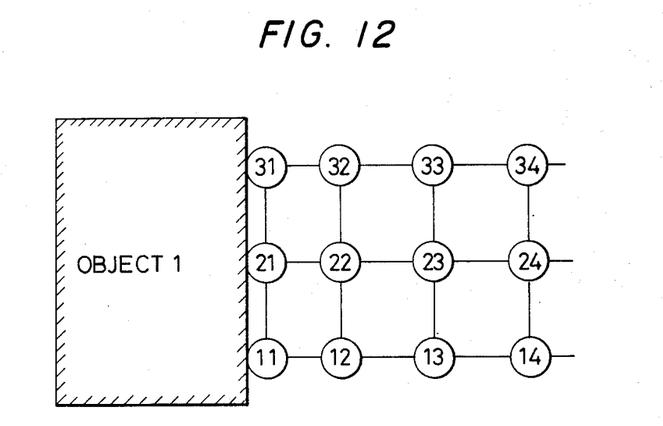
Figure 13:
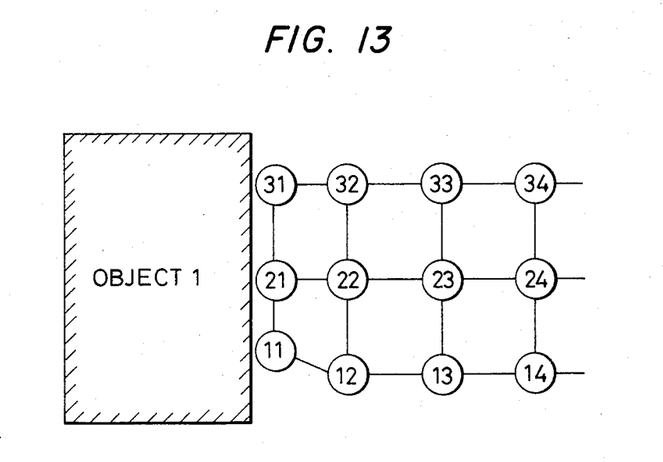

Incidentally, in FIG. 7, it is assumed that among the tips of the group of robot cells, only one robot cell 11 senses the object 1. However, the robot cells 11, 21, 31 might sense simultaneously the object 1 as depicted in FIG. 12. In such a case, each robot cell of the group can not extend the arm. In the case of FIG. 7, too, there might be the case in which the robot cell 11 does not slide on the object 1 when it comes into contact with the object, and can not extend the arm, either. In this case, the robot cell 11 of the first row, for example, is arranged in advance so as to slide along the object. Therefore, the robot cell 21 contracts the longitudinal active arm by a predetermined length, and makes free the lateral active arm of the robot cell 11. As a result, the robot cell 11 is attracted to the robot 12 as shown in FIG. 13. Next, the arm angle between the robot cells 11 and 12 is fixed, and the robot cell 21 extends the longitudinal active arm to the original length. Thereafter, the robot cells 11–17 of the first row extend their lateral active arms and encompass the object 1.

The second step is to grip the object 1 with a predetermined level of force when the group of the robot cells encompass the object 1. First, each robot cell stops extending the lateral arm. The robot cells 21–27 and 31–37 other than those of the first row fix the arm angles in the longitudinal and lateral directions, respectively.

Next, the robot cells 21–26 make control so as to extend the ordinate arm length between the robot cells that are in contact with the object 11–16 and the robot cells 21–26. After the arms are extended in a predetermined length, control of fastening the object 1 is completed.

The third step is to move the object that has thus been gripped. This can be accomplished when the robot cells on the column other than the robot cells coming into contact with the object 1 change their arm length in the same way as in the first step.

Since the robot of the present invention consists of a large number of robot cells, the robot does not undergo breakdown even when part of the cells are out of order. It will be assumed that the robot cell 22 of the second row, for example, in FIG. 7 is out of order and enters the free state. In this case, the arm length of the robot cell 22 is primarily determined by the control of the arm length of the adjacent robot cells. When the robot cell 12 of the first row is out of order, the longitudinal/lateral arm angle θ can not be measured. Accordingly, the robot cells 11, 21 and 31 keep the previous arm lengths fixed. When the robot cell 32 of the third row is out of order, no change of the control method is necessary for the other robot cells. However, when any of the robot cells 11, 21, 31 of the first column is out of order, the fastening control of the second step can not be effected, so that the robot cells 12, 22, 32 of the second row make control in place of the former.

The embodiment described above deals with the method of controlling a robot member formed by a group of robot cells when the object 1 exists, but even when the object 1 does not exist, the group of robot cells can be operated in accordance with a predetermined pattern. This can be accomplished by informing each robot cell of the first row, of the lateral arm length and of the arm angle so that each robot cell can make necessary control.

As can be clearly understood from the description that has been thus given, the hardware and software for each robot cell are uniform, and control by each robot cell is made through the communication between the adjacent robot cells. Accordingly, there is no necessity at all of the change of the content of each robot cell even when the number of robot cells is increased or decreased.

Though the robot structure described above is a rectangular shape consisting of three rows, a robot construction consisting of four or more rows or a construction having a hexagonal shape can be similarly realized.

The arm control of each robot cell may be made by methods other than the method described above.

The present invention makes it possible to constitute a robot by merely combining a plurality of autonomous robot cells having the same function, and to change the number of robot cells to be combined in accordance with an intended object. The hardware and software of the other robot cells need not be changed at all even when the combination of the robot cells or particular robot cells are expanded or diminished. Moreover, the robot as a whole does not undergo breakdown even when one or more of these robot cells are out of order, but can keep the predetermined function. Since a large number of robot cells can be used, the freedom of the operation of the robot as a whole can be increased in proportion to the number of interconnected robot cells employed. Since each robot cell operates independently, the response of the robot as a whole can be improved.

What is claimed is:

1. A cellular type robot apparatus having a cellular type component part consisting of a plurality of intercoupled robot cells, said component part being capable of controlling its shape through coordinate but independent movements by said robot cells; and an information transmission medium connecting each of said robot cells to other robot cells;

each of said robot cells including means for sending to other robot cells on said transmission medium information related to an operating status of said component part and means for independently determining and controlling the movements of its robot cell based on information received from said transmission medium, and at least one robot cell including means for detecting an operating status of said component part.

2. The cellular type robot apparatus as defined in claim 1 in which all of said robot cells are uniformly configured.

3. The cellular type robot apparatus as defined in claim 1 in which each of said cells includes means for detecting its own operating status.

4. The cellular type robot apparatus as defined in claim 1, further including means for exchanging information between a plurality of said robot cells, and means connected to said exchanging means for setting the object of action of said robot cells as a group.

5. The cellular type robot apparatus as defined in claim 1 wherein a plurality of said robot cells are connected in a building block arrangement by combination means capable of increasing and decreasing a parameter of the configuration formed by said robot cells.

6. The cellular type robot apparatus as defined in claim 1 wherein each of said robot cells includes combination means capable of changing the configuration of said component part with the other of said robot cells in response to the object of action.

7. The cellular type apparatus as defined in claim 5 wherein said combination means capable of changing the combined state is at least one arm of variable length.

8. The cellular type robot apparatus as defined in claim 7 wherein said combination means includes two sets of longitudinal and lateral arms.

9. The cellular type robot apparatus as defined in claim 6 wherein each of said robot cells further includes means for sensing the existence of an object in proximity thereto, means for sensing contact with said object, and a plurality of said robot cells including means to control the operations of said cells so as to come into contact with said object.

10. The cellular type robot apparatus as defined in claim 9 wherein said robot cells coming into contact with said object operate conjointly to grasp said object.

11. The cellular type robot apparatus as defined in claim 9 wherein each of said robot cells slides on said object upon coming into contact therewith allowing adjacent robot cells to come into contact with said object.

12. The cellular type robot apparatus as defined in claim 1 which further includes means for releasing the operating state of any of said robot cells which is out of order, and for letting robot cells adjacent to said robot cell which is out of order replace the operation of said out of order robot cell.

13. A robot apparatus comprising at least one group of interconnected robot cells which combine to provide a component part of variable configuration including means for setting the object of operation of said group of robot cells, wherein each of said robot cells includes:
an information transmission medium connecting each cell to said other cells;
means for sending to other robot cells an information on said transmission medium related to the status of said component part; and
means for independently deciding its own action based on information received from said transmission medium.

14. A cellular type robot apparatus comprising:
a plurality of robot cells physically coupled to one another to form a single manipulative member; and
an information transmission medium connected between said robot cells for carrying information to and from said cells from and to other cells;
each of said robot cells including:
first means for detecting the operating condition of the robot cell;
second means for detecting the operating condition of other robot cells; and
third means for controlling the operation of the robot cell on the basis of information provided by said first and second means.

15. A cellular type robot apparatus according to claim 14, wherein each robot cell is connected to at least one other robot cell by way of an arm of controllably variable length.

16. A cellular type robot apparatus according to claim 15, wherein a plurality of robot cells have a pair of lateral arms and a pair of longitudinal arms by which they are connected to adjacent robot cells, the length of said arms being controlled by said third means.

* * * * *